No. 872,118. PATENTED NOV. 26, 1907.
J. S. GILES.
HERMETIC CLOSURE FOR RECEPTACLES.
APPLICATION FILED JUNE 21, 1907.
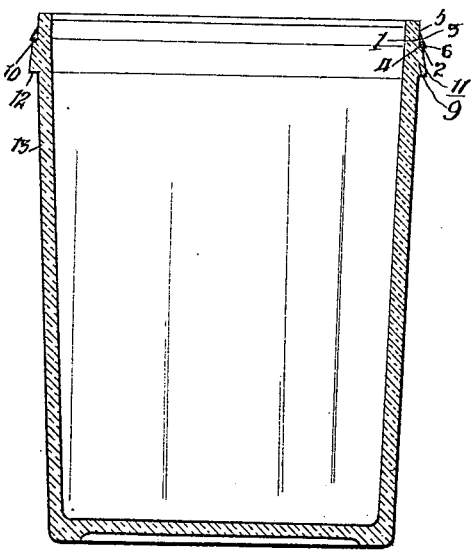
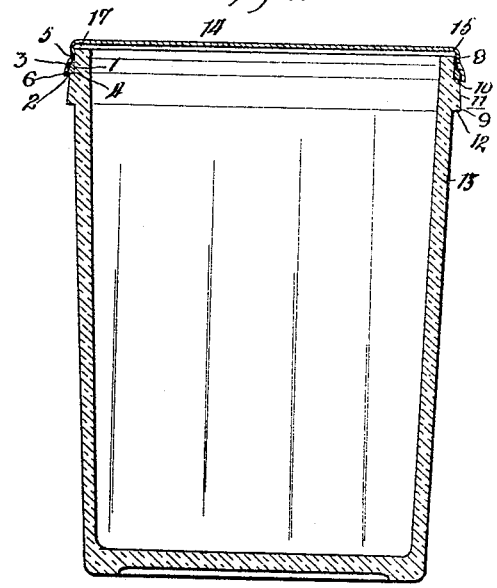
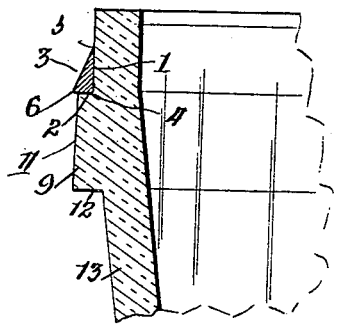
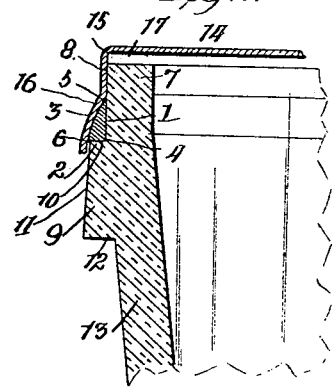
Witnesses
Wm. P. Bond
Pierson W. Banning
Inventor
John S. Giles
by Banning & Banning
Attys

UNITED STATES PATENT OFFICE.

JOHN S. GILES, OF CHICAGO, ILLINOIS.

HERMETIC CLOSURE FOR RECEPTACLES.

No. 872,118.  Specification of Letters Patent.  Patented Nov. 26, 1907.

Application filed June 21, 1907. Serial No. 380,088.

*To all whom it may concern:*

Be it known that I, JOHN S. GILES, residing at Chicago, in the county of Cook and State of Illinois, have invented certain new and useful Improvements in Hermetic Closures for Receptacles, of which the following is a specification.

This invention relates to improvements in closures for the hermetic sealing of jars and receptacles of the class having a supporting shouldered flange below the upper edge of the jar or receptacle, on which shouldered flange the sealing gasket abuts and rests.

The closure of the present invention pertains to the class termed or known as wedging closures in which the gasket is compressed by the application of a cover, in such manner as to force the gasket against the shouldered flange of the jar or receptacle and the exterior face of the jar or receptacle above the shouldered flange. The practice heretofore has been to employ a gasket circular in cross section in one form, or to employ a gasket square in cross section, or to employ a gasket of a rhomboid shape in cross section with parallel oblique edges and plane sides.

The gaskets of the various types heretofore employed, irrespective of their form in cross section, have been applied to the jar or receptacle and supported, prior to the sealing of the jar or receptacle, above the shouldered flange and encircling the exterior of the jar or receptacle, and in completing the sealing by forcing down the cover the gasket, no matter in what form as heretofore used, must be deflected from its original shape more or less, and it has been found in the use of the old styles of gaskets that a portion thereof is forced down between the inner face of the flange of the cover and the edge face of the flange on the jar or receptacle, and this without in any way perfecting the seal, but requiring an additional force to be applied to the cover in sealing the jar or receptacle.

The best sealing result is attained by compressing the gasket closely and tightly into the corner at the juncture of the exterior face of the jar or receptacle and the upper face of the flanged shoulder, but as a matter of fact, with the old types of sealing gaskets the forcing down of the cover to perfect the seal, instead of compressing the gasket into the corner, fails to so compress the gasket, with the result that more or less leakage has been found to occur between the cover and the jar and around the gasket, owing to imperfections in the contact faces for the gasket with the jar or receptacle, and to the fact that the gasket is not uniformly compressed so as to make a close, tight joint against leakage between the cover and the jar or receptacle.

The primary object of the present invention is to make a closure gasket of a triangular shape in cross section that will allow of the easy placing and forcing down of the cover, and have the cover, as it is forced to place, compress the gasket so as to force the corner thereof into the corner between the upper face of the shouldered flange and the exterior face of the jar or receptacle uniformly at all points, and thereby prevent leakage between the cover and the jar or receptacle; to combine the closure gasket of the present invention of a triangular shape in cross section with a cover and a jar or receptacle having a shouldered flange adjacent to its upper end, so that the application of the cover to the jar or receptacle will force the triangular shaped gasket into a sealing position; and to improve generally the sealing of a jar or receptacle by the application of the cover thereto through the medium of a gasket having a triangular shape in cross section.

The invention consists in the features of construction and combinations of parts hereinafter described and claimed.

In the drawings Figure 1 is a sectional elevation of a shouldered jar or receptacle, having the gasket of the present invention applied thereto, and without the cover; Fig. 2 a similar view to Fig. 1, with the cover in place; Fig. 3 a detail enlarged, showing the shouldered upper end of a jar or receptacle, with the gasket of the present invention and without the cover; and Fig. 4 a similar view to Fig. 3, with the cover in place.

The gasket of the present invention is made of rubber or other suitable compressible and yieldable material, and is of a triangular form in cross section having a straight plane inner face 1, a straight plane lower edge face 2, and an inclined or oblique outer face 3, so as to furnish a right angle corner 4, at the juncture of the side face 1 and lower edge face 2; and an acute angle corner 5, at the juncture of the side face 1 and oblique face 3 at the top; and an acute angle corner 6, at the juncture of the lower plane face 2 and the oblique face 3 at the bottom.

The jar or receptacle is of a form to have a neck or rim 7 at the top, with an outer straight or plane face 8 extending down to a flange 9, having a shoulder 10 with a flat face on the upper side of the flange, and an oblique outer face 11, extending to the under shoulder 12 of the flange, which shoulder connects with the body 13 of the jar.

The cover, in the construction shown, is one having a top plate 14 with a depending flange formed of a straight section or portion 15, standing at right angles to the top plate, and an outwardly curved section or portion 16 continuing from the straight portion 15, but the cover could be of other shape, so long as the shape was one to be forced onto the top of the jar or receptacle and compress the gasket or packing ring, as hereinafter described.

In use, the gasket or packing ring of the present invention is placed in position for its straight plane face 1 to contact or lie against the exterior plane face 8 of the rim or neck of the jar or receptacle, and for its lower straight plane edge 2 to lie against or abut the straight plane face of the upper shoulder 10 of the flange 9 of the jar or receptacle; as shown in Figs. 1 and 2. The jar or receptacle is filled with the material, and when filled the cover is placed loosely on top of the jar or receptacle and the jar or receptacle, with the cover loosely placed thereon, is inserted in a vacuum chamber and the air exhausted from the jar or receptacle in the usual manner, and after the air has been exhausted the cover is forced to place, as shown in Figs. 2 and 4, completing the closing and sealing of the jar or receptacle.

The forcing of the cover onto the top of the jar or receptacle brings the curved section or portion 16 of the depending flange of the cover with its inner face bearing against the oblique outer face 3 of the triangular shaped gasket of the present invention, and the pressure of the inner face of the section or portion 16 of the cover against the outer oblique face of the gasket, forces the gasket downwardly and inwardly pressing the corner 4 tightly into and against the corner joining the straight plane face 8 of the neck or rim of the jar or receptacle and the straight plane face of the shoulder 10 of the flange, and at the same time forcing the straight plane face 1 tightly against the straight plane face 8 of the neck or rim of the jar or receptacle and compressing the corner 5, at the point of departure of the curved section or portion 16 of the flange or rim of the cover from the straight plane portion 15 of the depending flange of the cover, and also forcing the straight plane face 2 of the gasket tightly against the straight plane face of the shoulder 10 of the flange 9 of the jar or receptacle.

The compression of the gasket, by the depending flange of the cover, is downwardly and inwardly, forcing the corner 4 tightly and closely into the corner between the exterior face of the neck or rim and the upper face of the flange of the jar or receptacle, at which point, in order to obtain a perfect seal for the jar or receptacle, the gasket should fit the corner so as to make a tight and close joint against leakage that would destroy the vacuum in the jar or receptacle. The impact or impingement of the edge 2 of the gasket or sealing ring against the face of the shoulder 10 and the impact or impingement of the face 1 of the gasket or sealing ring against the face 8 of the neck or rim of the jar or receptacle, and the impact or impingement of the inner face of the section or portion 16 of the depending flange against the oblique face 3 of the gasket or sealing ring, in connection with the forcing of the corner 4 into the corner between the face 8 of the neck or rim and the shoulder 10 of the flange of the jar or receptacle, insures a seal for the cover and the jar or receptacle which will be uniform and perfect and which will prevent leakage or breaking of the seal, with the ordinary and usual handling of the filled jar or receptacle.

The shape of the triangular gasket or sealing ring in cross section is one in which the oblique outer face furnishes a bearing face for the inner face of the depending flange, and is of a form that will offer but little resistance to the setting of the cover down into sealing position, as, in forcing the cover down, the inner face of the flange will press against the oblique face of the gasket or sealing ring in a downwardly inward direction, forcing the sealing corner 4 and the sealing faces 1 and 2 of the gasket or ring downward and inward, and at the same time the corner 6 is not required to be forced over the outer corner of the shoulder 10 and the flange 9 in making and perfecting the seal, and when the cover is in place a space 17 will remain between the upper edge of the neck or rim of the jar or receptacle and the top plate 14 of the cover as usual.

The gasket or sealing ring, by reason of its triangular shape in cross section enables a uniform and perfect compression thereof to be obtained by forcing down the cap or cover of the jar or receptacle, and such compression is transmitted downwardly and inwardly so as to effect a tight sealing and closure of the jar or receptacle.

The closure gaskets of the various types heretofore used, when in place on the jar and forced to place by the cover, owing to their resiliency, furnish an unequal bearing, so that, with the best care possible in placing and forcing the cover down, more or less shifting of the cover occurs, which results in an unequal pressure against the gasket, making it impossible to form a perfect seal between the cover and the jar; and again, owing to the formation of the old types of gaskets, in order to overcome the resiliency of the gasket and the natural tendency thereof to assume its original formation in cross section, great force must be used in applying the cover, and even with a force sufficient to overcome the resistance of the gasket it is impossible, in all cases, to so compress the gasket as to force its contact faces in close impingement against the companion faces of the cover and the rim and flange of the jar, so as to make an air tight joint at every point between the cover and the jar by the gasket.

The contour of a round, rectangular or rhomboidal shaped gasket, such as heretofore used, presents a surface which must be compressed closely in order to have a full contact of surfaces between the cover and the gasket and between the gasket and the rim and flange of the jar, and unless the force applied to the cover is sufficient to compress the gasket so as to conform exactly to the surfaces of the cover and the rim or neck of the jar and the flange, an imperfect closure will follow. These objections, which have been found by actual practice in the use of the old types of gasket, are entirely overcome with the triangular shaped gasket of the present invention, which furnishes a straight plane face to coact with the straight plane face of the rim, and a straight plane bottom face to coact with the straight plane face of the shoulder of the flange, and an oblique or inclined face to coact with the outwardly turned or flared portion of the cover, with the result that, in forcing the cover to place, the flange of the cover impinges directly against the oblique face of the gasket and transmits a force inwardly and downwardly, by which the plane faces of the gasket will be brought closely against the plane faces of the rim and flange of the jar, and this without the requirement of any great force in placing the cover in position, as the oblique face of the gasket presents a surface over and against which the outwardly flared portion of the flange will readily pass, and in passing apply the necessary pressure to force and hold the gasket in place, making a tight closure between the cover and the jar.

The closures to which the foregoing considerations apply are used solely for packing food and other products under a vacuum. Atmospheric pressure alone is relied upon to hold the cover on and maintain a hermetic seal after vacuum is obtained. To make this satisfactory and commercially successful, not only must there be the highest possible vacuum, but the shape, application and direction of the cover must be such as to aid and increase the force of the air pressure at the sealing point. Hence the cover is constructed so that it bears on the gasket with a wedging force. The contrivance here aimed at is to have the contact faces at the sealing point conform in the jar, gasket and cover, so as to save the waste of pressure in forcing a conformity in the contact faces of the gasket to make the seal, and thus save an important percentage of leakers.

What I claim as new and desire to secure by Letters Patent is:

1. The combination with a receptacle having a rim or neck and a flange at the upper end, and a cap having a flaring depending flange, of a gasket triangular shaped in cross section, furnishing a lower right angle corner, a lower acute angle corner, and an upper acute angle corner, and presenting inner, lower, and outer contact faces conforming to and co-acting with the contact faces of the neck and flange of the receptacle and the flange of the cap, with the lower right angle corner entering into the corner joining the neck and flange of the receptacle, substantially as described.

2. A closure for hermetically sealed receptacles, comprising a gasket having a triangular shape in cross section and furnishing a straight plain inner face, a straight plane lower face, and an oblique outer face, and a cap having a depending flange with an inner seating face engaging the inclined or oblique outer face of the gasket and forcing the gasket as a whole downwardly and inwardly, substantially as described.

3. A closure for hermetically sealed receptacles, comprising a gasket having a triangular shape in cross section and furnishing a straight plain inner face, a straight plane lower face and an oblique outer face, and a cap having a depending flange with a straight section and an outwardly curved section, the outwardly curved section furnishing a bearing face against the oblique outer face of the gasket for forcing the gasket as a whole downwardly and inwardly, substantially as described.

JOHN S. GILES.

Witnesses:
OSCAR W. BOND,
WALKER BANNING.